Dec. 18, 1928.  1,695,536
J. P. CROWLEY
VALVE
Filed June 10, 1925
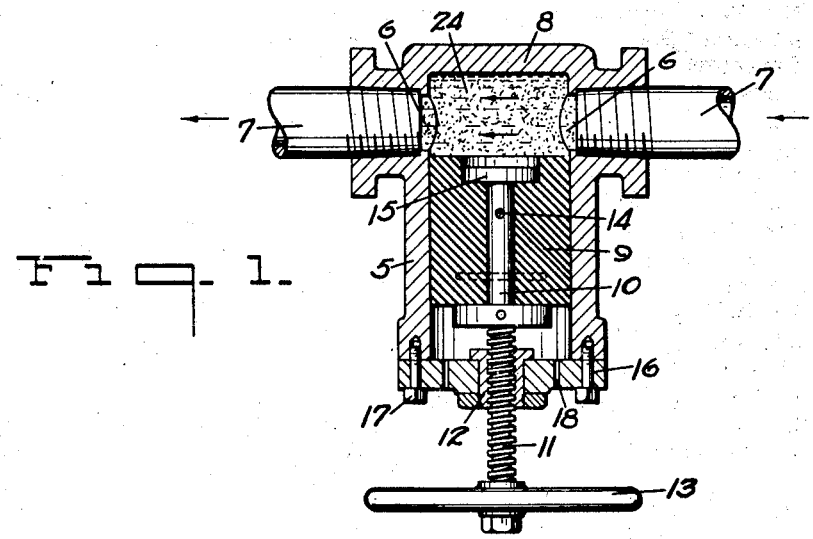
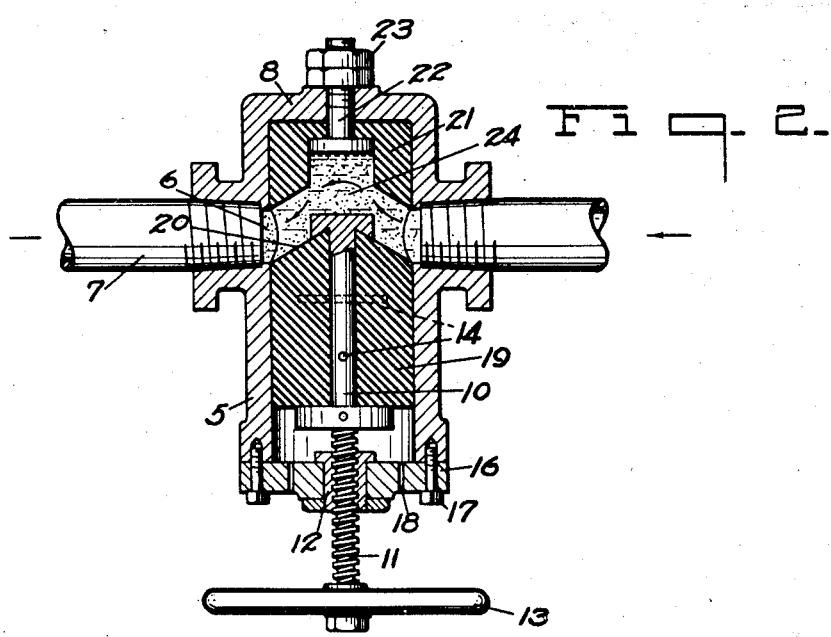
INVENTOR.
Joseph P. Crowley.
Frank Fraser.
ATTORNEY.

Patented Dec. 18, 1928.

1,695,536

UNITED STATES PATENT OFFICE.

JOSEPH P. CROWLEY, OF TOLEDO, OHIO, ASSIGNOR TO THE LIBBEY-OWENS SHEET GLASS COMPANY, OF TOLEDO, OHIO, A CORPORATION OF OHIO.

VALVE.

Application filed June 10, 1925. Serial No. 36,185.

The present invention relates to a valve, and has reference to a valve particularly constructed for use in systems using various forms of abrasives.

An important object of the invention is to provide a valve having a compressible preferably rubber plunger operable within a housing, the said plunger being adapted to fill up any irregularities in the housing.

Still another object of the invention is to provide a valve of this nature including a compressible valve seat and plunger, the said seat and plunger being formed preferably from a rubber composition whereby the plunger may be firmly pressed against the seat to create a joint capable of withstanding the wear of abrasives.

Other objects and advantages of the invention will become apparent during the course of the following description.

In the drawings wherein like numerals are employed to designate like parts throughout the same, Fig. 1 is a vertical transverse section through one form of valve constructed in accordance with the present invention, and Fig. 2 is a slightly modified form thereof.

This valve is primarily designed for use in an abrasive system for grinding and polishing plate glass. In the grinding of plate glass various abrasives such as sand, garnet, carborundum, etc. are maintained in suspension in water, and are continuously circulated through a pipe under pressure past the machines. The abrasives wear away parts of ordinary valves so that in a comparatively short time the valve leaks and it is necessary to replace the same. Although this particular valve is primarily designed for use in such systems it is in no way restricted to such use as it can be used anywhere that ordinary valves are now used.

The invention comprises, as is shown in Fig. 1, a housing 5 provided with ports 6 having connections with conduits 7, the said pipes constituting the system in which the valve is disposed. As is shown in Fig. 1 the ports 6 are arranged a substantial distance from the end 8 of the valve. A plunger 9 is operable within the housing 5 and is preferably formed from a compressible relatively soft composition. The idea of this soft composition is to provide a member operable within the housing which can be moved toward the end 8 to close off the ports 6. Assuming that the abrasives will wear away or form irregular places in the housing 5, the resilient compressible plunger 9 will fill up these cavities, thus preventing leakage. The plunger 9 may be formed from a rubber composition and is carried by the valve stem 10 which is provided with the threaded end 11 operable through the threaded bushing 12. An operating wheel or lever 13 is keyed to the end of the threaded portion 11 whereby the valve stem may be rotated to move the plungers 9 to and from the end 8. Pins 14 are carried by the valve stem 10 and are received within the plunger so that the plunger and stem will move as an integral unit. The washer 15 carried by the end of the stem 10 is countersunk to permit the plunger 9 to be forced tightly against the end to insure the proper valve action.

A removable plate 16 held in place by means of the studs 17 is provided to close the end of the valve. Apertures 18 are formed in the plate 16 to permit escape of what little amount of fluid that might possibly get down to that end of the valve. In Fig. 2 the construction shown is very similar to that shown in Fig. 1, except for the fact that the plunger 19 is bevelled at its end as at 20 and is adapted to be received within a valve seat 21. The valve seat 21 is formed from the same material as the plunger. As has been pointed out, the most desirable composition for this use is a relatively soft resilient compressible rubber composition. The valve seat 21 may be held in place by means of the capped screw 22 passing through the end 8 and held in place by means of the nuts 23.

The numeral 21 designates an abrasive in suspension passing through the valve. In view of the construction of the valve, the plates 16 can easily be removed and a new plunger inserted without serious interruption to the system in which the valve is used. Because of the characteristics of the plunger and the valve seat, the valve will not require attention for a considerable time after it has been placed in use as the composition used is adapted to be forced outwardly to take care of the wear that may be had on the interior of the housing.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. A valve of the class described comprising a housing provided adjacent one end thereof with oppositely directed ports, a compressible plunger slidable within the housing for controlling the effective opening of said ports, and a plate for the end of the housing remote from the ports provided with an opening for permitting the escape of any liquid which might seep past said plunger.

2. A valve of the class described comprising a housing provided adjacent one end thereof with oppositely directed ports, a compressible plunger within the housing, a plate for the end of the housing remote from the ports provided with an opening for permitting the escape of any liquid which might seep past the plunger, and a valve stem received through said plate for moving said plunger to control the effective opening of said ports.

3. A valve of the character described comprising a housing provided with ports adjacent the upper end thereof, a plunger slidable within the housing beneath said ports, a plate closing the lower end of the housing and provided with an opening for permitting the escape of any liquid which might seep past the plunger, and a valve stem received through said plate for moving said plunger to control the effective opening of said ports.

4. A valve of the class described comprising a housing provided with ports, a compressible valve seat at one side of the ports and a compressible plunger at the opposite side of said ports adapted to cooperate with said seat for controlling the effective opening and the closing of the ports.

5. A valve of the character described comprising a housing provided with ports, a compressible valve seat at one side of the ports, a compressible plunger at the opposite side of said ports, and means for moving said plunger toward and away from said seat to control the effective opening and the closing of said ports.

6. A valve of the character described comprising a housing provided with oppositely directed ports, a compressible valve seat arranged within one end of the housing, a compressible plunger slidable within the opposite end of the housing, and means for moving the said plunger towards and away from said seat to control the effective opening and the closing of said ports.

7. A valve of the character described, comprising a housing provided with ports, a compressible valve seat and plunger therein, and means for rotating and reciprocating the plunger to control the effective opening and the closing of said ports.

8. A valve of the character described, comprising a housing provided with ports, a compressible valve seat and plunger therein, and means for moving the plunger to and from the valve seat to control the effective opening and the closing of said ports.

Signed at Toledo, in the county of Lucas and State of Ohio, this 8th day of June, 1925.

JOSEPH P. CROWLEY.